US007453393B2

(12) United States Patent
Duivenvoorden

(10) Patent No.: US 7,453,393 B2
(45) Date of Patent: Nov. 18, 2008

(54) COUPLER WITH WAVEGUIDE TRANSITION FOR AN ANTENNA IN A RADAR-BASED LEVEL MEASUREMENT SYSTEM

(75) Inventor: Johannes Theodorus Cornelis Duivenvoorden, Trent River (CA)

(73) Assignee: Siemens Milltronics Process Instruments Inc., Peterborough, Ontario (CA)

( * ) Notice: Subject to any disclaimer, the term of this patent is extended or adjusted under 35 U.S.C. 154(b) by 222 days.

(21) Appl. No.: 11/037,925

(22) Filed: Jan. 18, 2005

(65) Prior Publication Data

US 2006/0158371 A1 Jul. 20, 2006

(51) Int. Cl.
*H03H 7/38* (2006.01)
*G01S 13/08* (2006.01)

(52) U.S. Cl. ............... 342/124; 342/175; 73/290 R; 333/32

(58) Field of Classification Search ................. 342/124; 73/291

See application file for complete search history.

(56) References Cited

U.S. PATENT DOCUMENTS

| 2,767,380 | A | * | 10/1956 | Zobel | 333/35 |
|---|---|---|---|---|---|
| 3,594,663 | A | * | 7/1971 | Allen | 333/1 |
| 4,280,112 | A | * | 7/1981 | Eisenhart | 333/21 R |
| 4,503,433 | A | * | 3/1985 | Tomasi | 342/87 |
| 5,365,178 | A | * | 11/1994 | Van Der Pol | 324/644 |
| 5,369,367 | A | * | 11/1994 | Eisenhart | 324/632 |
| 5,438,867 | A | * | 8/1995 | van der Pol | 73/290 V |
| 5,614,911 | A | * | 3/1997 | Otto et al. | 342/124 |
| 5,689,265 | A | * | 11/1997 | Otto et al. | 342/124 |
| 5,799,534 | A | * | 9/1998 | van der Pol | 73/290 V |
| 5,926,080 | A | * | 7/1999 | Palan et al. | 333/252 |
| 5,969,666 | A | * | 10/1999 | Burger et al. | 342/124 |
| 6,222,500 | B1 | * | 4/2001 | Koitsalu et al. | 343/864 |
| 6,353,418 | B1 | * | 3/2002 | Burger et al. | 343/786 |
| 6,417,748 | B1 | * | 7/2002 | Lopatin et al. | 333/252 |
| 6,606,904 | B2 | * | 8/2003 | Muller et al. | 73/290 V |
| 6,614,391 | B1 | * | 9/2003 | Burger et al. | 342/124 |
| 6,677,891 | B2 | * | 1/2004 | Fehrenbach et al. | 342/124 |
| 6,727,845 | B2 | * | 4/2004 | Burger | 342/124 |
| 6,750,657 | B2 | * | 6/2004 | Griessbaum et al. | 324/642 |
| 6,759,976 | B1 | * | 7/2004 | Edvardsson | 342/124 |
| 6,759,977 | B1 | * | 7/2004 | Edvardsson et al. | 342/124 |

(Continued)

OTHER PUBLICATIONS

J.D. Kraus, D.A. Fleisch; Electromagnetics with Applications, 5th Edition, McGraw-Hill 1999, pp. 456-459 & 466-469.

*Primary Examiner*—Thomas H. Tarcza
*Assistant Examiner*—Matthew M Barker
(74) *Attorney, Agent, or Firm*—Tarolli, Sundheim, Covell & Tummino LLP

(57) ABSTRACT

A mechanism for coupling a coaxial waveguide to another waveguide. The mechanism includes a lower or matching waveguide and an impedance transformer. A coaxial port couples the coaxial waveguide to the matching waveguide. The matching waveguide has a waveguide impedance which is close to the impedance of the coaxial waveguide. This arrangement allows matching between the coaxial waveguide and the matching waveguide over a wider frequency band. The impedance transformer couples the matching waveguide to the other waveguide. The impedance transformer comprises a single-stage, double-stage, or multi-stage transformer. The mechanism is suitable for coupling an antenna to a coaxial cable interface in a radar or microwave based level measurement or time of flight ranging systems.

16 Claims, 7 Drawing Sheets

U.S. PATENT DOCUMENTS

| | | |
|---|---|---|
| 6,825,798 B2 * | 11/2004 | McGregor ................... 342/124 |
| 7,046,189 B2 * | 5/2006 | Spanke et al. ............... 342/124 |
| 7,075,479 B2 * | 7/2006 | Andersson .................. 342/124 |
| 2002/0097108 A1 * | 7/2002 | Jain ............................ 333/26 |
| 2002/0124644 A1 * | 9/2002 | Lubbers .................... 73/290 R |
| 2002/0154052 A1 * | 10/2002 | Fehrenbach et al. ......... 342/124 |
| 2003/0169197 A1 * | 9/2003 | McGregor ................... 342/124 |
| 2004/0011126 A1 * | 1/2004 | Otto et al. ................. 73/290 R |
| 2004/0108951 A1 * | 6/2004 | Edvardsson ................. 342/124 |
| 2004/0119635 A1 * | 6/2004 | Edvardsson ................. 342/124 |
| 2004/0173020 A1 * | 9/2004 | Edvardsson ............... 73/290 V |
| 2004/0183718 A1 * | 9/2004 | Hagg ......................... 342/124 |
| 2005/0017896 A1 * | 1/2005 | Klofer et al. ................ 342/124 |
| 2005/0052314 A1 * | 3/2005 | Spanke et al. ............... 342/124 |
| 2007/0008212 A1 * | 1/2007 | Serban et al. ............... 342/124 |
| 2007/0034002 A1 * | 2/2007 | Reimelt et al. ............ 73/290 R |

* cited by examiner

COUPLER WITH WAVEGUIDE TRANSITION FOR AN ANTENNA IN A RADAR-BASED LEVEL MEASUREMENT SYSTEM

FIELD OF THE INVENTION

The present invention relates radar-based level measurement systems, and more particularly to a coupler with a waveguide transition mechanism suitable for rod antenna and horn antenna applications, and other waveguide-based antennas such as slotted waveguides.

BACKGROUND OF THE INVENTION

Time of flight ranging systems find use in level measurements applications, and referred to as level measurement systems. Level measurement systems determine the distance to a reflective surface (i.e. reflector) by measuring how long after transmission energy, an echo is received. Such systems may utilize ultrasonic pulses, pulse radar signals, or other microwave energy signals.

Pulse radar and microwave-based level measurement systems are typically preferred in applications where the atmosphere in the container or vessel is subject to large temperature changes, high humidity, dust and other types of conditions which can affect propagation. To provide a sufficient receive response, a high gain antenna is typically used. High gain usually translates into a large antenna size with respect to the wavelength.

Two types of antenna designs are typically found in microwave-based level measurement systems: rod antennas and horn antennas. Rod antennas have a narrow and elongated configuration and are suitable for containers having small opening/flange sizes and sufficient height for accommodating larger rod antennas. Horn antennas, on the other hand, are wider and shorter than rod antennas. Horn antennas are typically used in installations with space limitations, for example, vessels or containers which are shallow.

The level measurement instrument or device comprises a housing and a waveguide (i.e. the antenna). The level measurement instrument is mounted on top of a container or vessel and the antenna extends into the vessel. The level measurement instrument is typically bolted to a flange around the opening of the container. The housing holds the electronic circuitry. The antenna extends into the interior of the vessel and is connected to a coupler which is affixed to the housing. The antenna is electrically coupled to the electronic circuit through a coaxial cable (i.e. waveguide). The coaxial cable has one terminal connected to the antenna coupler and the other terminal is connected to a bidirectional or input/output port for the electronic circuit. The antenna converts guided waves into free radiated waves, and is reciprocal, i.e. also converts the free radiated waves into guided waves. The antenna is excited by electromagnetic (i.e. radio frequency) pulses or energy received through the coaxial cable from the circuit and transmits electromagnetic pulses or energy into the vessel. The antenna couples the pulses that are reflected by the surface of the material contained in the vessel and these pulses are converted into guided electromagnetic signals or energy pulses which are guided by the coaxial cable (i.e. waveguide) to the circuit.

It will be appreciated that the coaxial cable operates as a coaxial waveguide and the antenna comprises a circular waveguide. If there are losses or signal degradation in the transition between the coaxial waveguide and the antenna waveguide, then radar performance is affected.

Accordingly, there remains a need for improvements in the coupling between a coaxial waveguide and the antenna configuration for radar-based level measurement systems.

BRIEF SUMMARY OF THE INVENTION

The present invention provides an antenna coupler mechanism suitable for use in microwave-based level measurement devices based on pulsed signals or continuous signals and time of flight ranging systems.

In a first aspect, the present invention provides a coupler mechanism for coupling a coaxial waveguide with another waveguide, the coupler mechanism comprises: a coaxial waveguide port for receiving the coaxial waveguide, the coaxial waveguide has a coaxial waveguide impedance; a port for coupling the other waveguide, the other waveguide has a waveguide impedance; an impedance transformer; and a matching waveguide; the matching waveguide is coupled to the coaxial waveguide port, and the matching waveguide has an impedance approximately matching the impedance of the coaxial waveguide; the impedance transformer has a first port for receiving the matching waveguide, a second port for the other waveguide and a transition section, the transition section serves to substantially match the impedance of the other waveguide with the impedance of the matching waveguide.

In another aspect, the present invention provides a level measurement apparatus for determining a level measurement for material contained in a vessel, the level measurement apparatus comprises: an antenna; a controller having a receiver module and a transmitter module, the controller has a bidirectional port for connecting to one end of a coaxial waveguide; a coupler having a coaxial port for receiving the other end of the coaxial waveguide and coupling the coaxial waveguide to the antenna; the coupler includes a transition mechanism for transferring the electromagnetic energy between the coaxial waveguide and the antenna, the transition mechanism includes an impedance transformer and a matching waveguide, the matching waveguide is coupled to the coaxial port, and the matching waveguide has an impedance approximately matching the impedance of the coaxial waveguide, the impedance transformer has a first port for receiving the matching waveguide, a second port for coupling to the antenna, and a transition section, the transition section serves to substantially match the impedance of the antenna with the impedance of the matching waveguide; the coupler further includes a stepped section, the stepped section receives the impedance transformer, and the transition section in the impedance transformer has one or more waveguide transitions, and the stepped section of the coupler has one or more steps corresponding to the waveguide transitions; the antenna is responsive to electromagnetic signals received from the transmitter module through the coaxial waveguide for emitting electromagnetic energy, and the antenna converts reflected electromagnetic energy into electromagnetic signals which are received by the receiver module through the coaxial waveguide; the controller includes a program component for determining the distance travelled by the electromagnetic signals and calculating the level measurement for the material contained in the vessel.

In yet another aspect, the present invention provides an apparatus for coupling a coaxial waveguide with a circular waveguide, the apparatus comprises: a coaxial waveguide port for receiving the coaxial waveguide, the coaxial waveguide has a coaxial waveguide impedance, and the circular waveguide has an associated impedance; an impedance transformer; a matching waveguide; the matching waveguide is coupled to the coaxial waveguide port, and the matching waveguide has an impedance approximately matching the impedance of the coaxial waveguide; the impedance transformer has a first port for receiving the matching waveguide, a port for coupling to the circular waveguide and a transition section, the transition section has one or more waveguide transitions, the transition section serves to substantially match the associated impedance of the circular waveguide with the impedance of the matching waveguide; a stepped section, the stepped section receives the impedance transformer, and the stepped section has one or more steps corresponding to the waveguide transitions.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference is now made to the accompanying drawings which show, by way of example, embodiments of the present invention and in which.

In the drawings, like references or characters indicate like elements or components.

DETAILED DESCRIPTION OF EMBODIMENTS OF THE INVENTION

Figure 1:
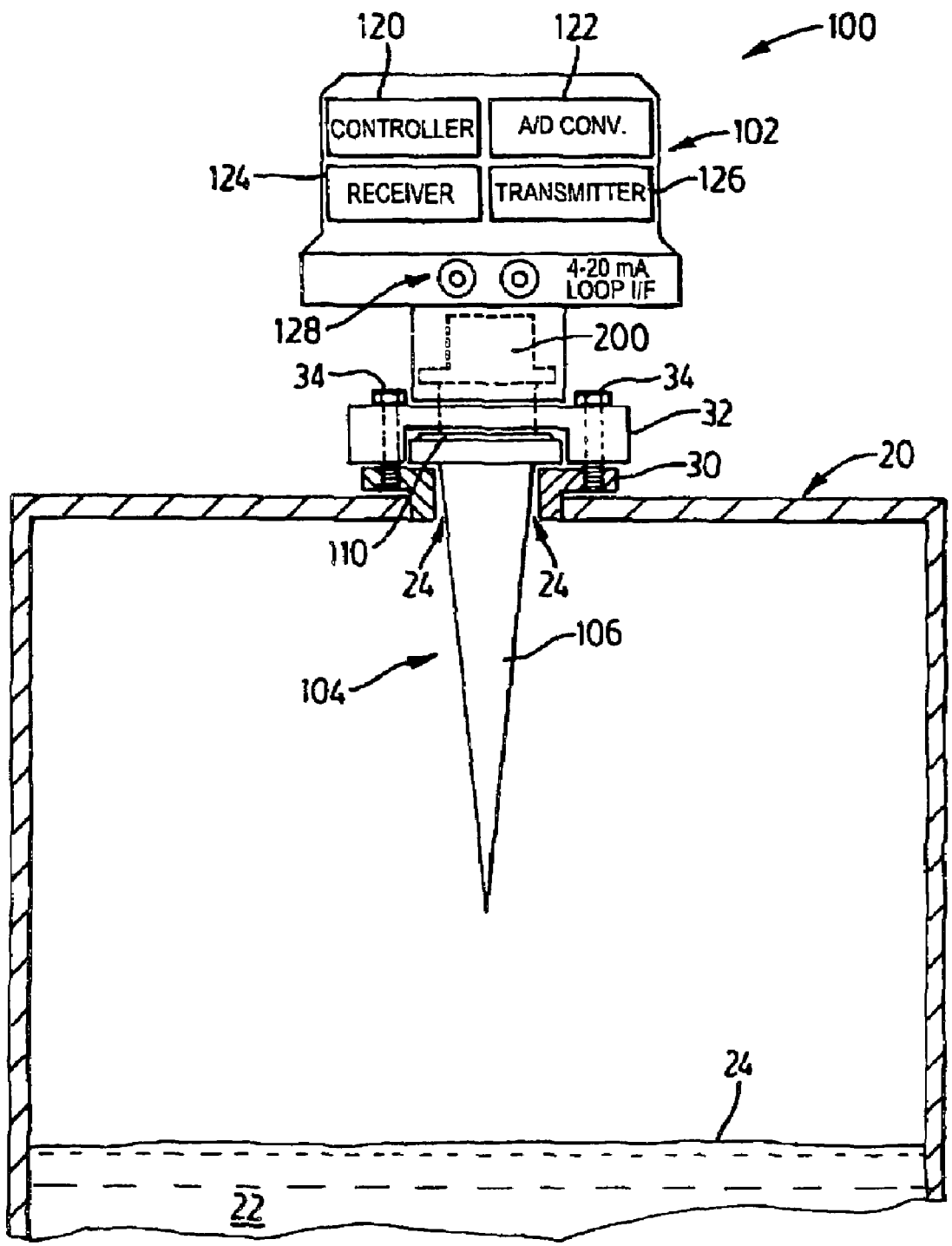
FIG. 1 shows in diagrammatic form a radar-based level measurement system with an antenna coupling mechanism according to the present invention.

Reference is first made to FIG. 1 which shows in diagrammatic form a radar-based or a microwave-based level measurement apparatus 100 with an antenna having a coupler assembly or transition structure in accordance with the present invention.

As shown in FIG. 1, the level measurement apparatus 100 is mounted on top of a container or vessel 20 which holds a material 22, e.g. liquid, slurry or solid. The level measurement apparatus 100 functions to determine the level of the material 22 held in the vessel 20. The level of the material 20 is defined by a top surface, and denoted by reference 23, which provides a reflective surface for reflecting electromagnetic waves or energy pulses. The vessel or container 20 has an opening 24 which may include a flange 30. The level measurement apparatus 100 is attached or clamped to the opening 24 using suitable fasteners as will be familiar to those skilled in the art.

The level measurement apparatus 100 comprises a housing member or enclosure 102 and an antenna assembly 104. The housing 100 holds electrical/electronic circuitry as described below. The antenna assembly 104 extends into the interior of the vessel 20 and comprises an antenna or waveguide 106. As will be described in more detail below, the antenna or waveguide 106 comprises a rod antenna structure 220 (FIG. 2(a)). According to another embodiment, the antenna 106 may comprise a horn antenna arrangement 250 as shown in FIG. 2(b). As will also be described in more detail below, the antenna assembly 104 includes an antenna coupler and a waveguide transition mechanism in accordance with the present invention, indicated generally by reference 200 in FIGS. 1 and 2.

The level measurement apparatus 100 includes circuitry comprising a controller 120 (for example a microcontroller or microprocessor), an analog-to-digital converter 122, a receiver module 124 and a transmitter module 126. The level measurement circuitry 100 may also include a current loop interface (4-20 mA) indicated by reference 128. The antenna 106 is coupled to the controller 120 through the transmitter module 126 and the receiver module 124. The physical connection between the antenna 106 and the transmitter module 126 and the receiver module 124 comprises a waveguide 246 (FIGS. 2(a), 2(b) and FIG. 3) and the coaxial cable or waveguide 220 (FIG. 2) and a bidirectional (i.e. input/output) port on the level measurement apparatus 100. As will be described in more detail below, the waveguide 246 is coupled to one terminal of the coaxial cable or waveguide 220 through the transition mechanism 210 (FIGS. 2 and 3) in the antenna coupler 200. The other terminal of the coaxial cable 220 is connected to the bidirectional port for the controller 120. The controller 120 uses the transmitter module 126 to excite the antenna 106 with electromagnetic energy in the form of radar pulses or continuous radar waves. The electromagnetic energy, i.e. guided radio frequency waves, are transmitted to the antenna 106 through the coaxial cable 220 and the waveguide 246 (FIG. 2) coupled to the antenna 106. The antenna 106 converts the guided waves into free radiating waves which are emitted by the antenna 106 and propagate in the vessel 20. The electromagnetic energy, i.e. reflected free radiating waves, reflected by the surface 23 of the material 22 contained in the vessel 20 is coupled by the antenna 106 and converted into guided electromagnetic signals which are transmitted through the antenna coupler 200 (i.e. the waveguide 246 and the transition mechanism 210) to the coaxial waveguide and back to the receiver module 124. The electromagnetic signals received from the antenna 106 through the coaxial waveguide 220 are processed and then sampled and digitized by the A/D converter 122 for further processing by the controller 120. The controller 120 executes an algorithm which identifies and verifies the received signals and calculates the range of the reflective surface 23, i.e. based on the time it takes for the reflected pulse (i.e. wave) to travel from the reflective surface 23 back to the antenna 106. From this calculation, the distance to the surface 23 of the material 22 and thereby the level of the material, e.g. liquid 22 in the vessel 20, is determined. The controller 120 also controls the transmission of data and control signals through the current loop interface 128. The controller 120 is suitably programmed to perform these operations as will be within the understanding of those skilled in the art. These techniques are described in prior patents of which U.S. Pat. No. 4,831,565 and U.S. Pat. No. 5,267,219 are exemplary.

The antenna assembly 106 will typically include an appropriate internal metallic structure (not shown) for functioning as a waveguide in conjunction with the transmitter 126 and receiver 124 modules. The antenna assembly 106 transmits electromagnetic signals (i.e. free radiating waves) onto the surface 23 of the material 22 in the vessel 20. The electromagnetic waves are reflected by the surface 23 of the material 22, and an echo signal is received by the antenna assembly 106. The echo signal is processed using known techniques, for example, as described above, to calculate the level of the material 22 in the vessel 20.

Figure 2A:
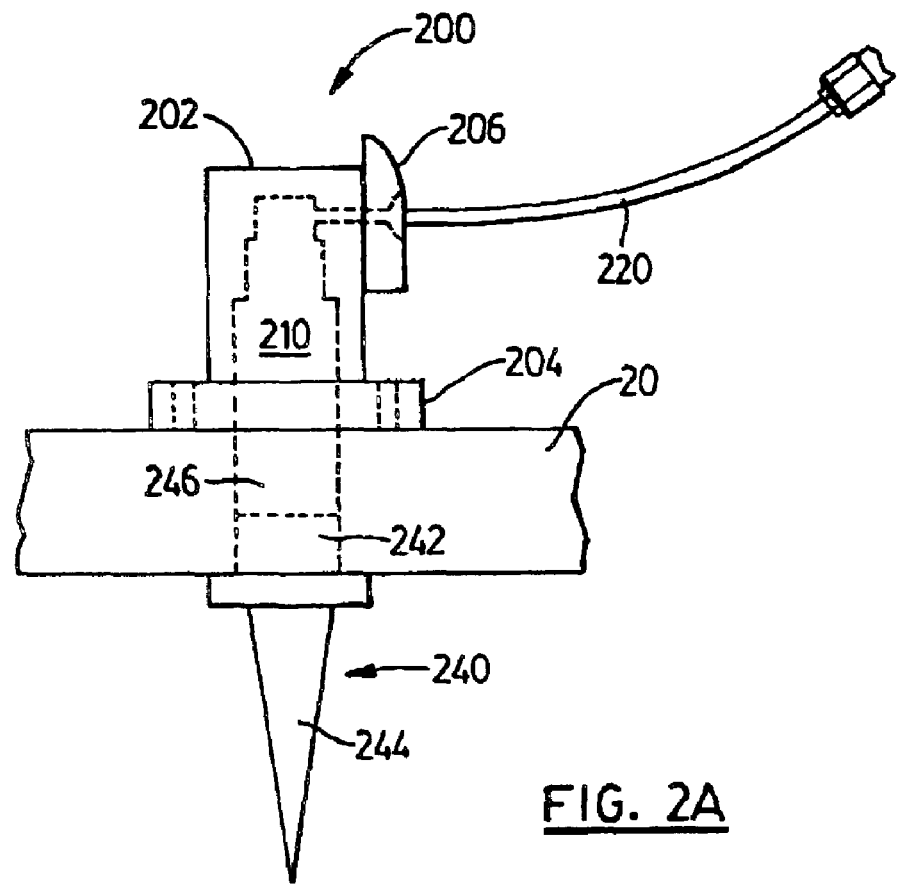
FIG. 2(a) shows an antenna coupler with a transition mechanism according to the present invention configured for a rod antenna.
Figure 2B:
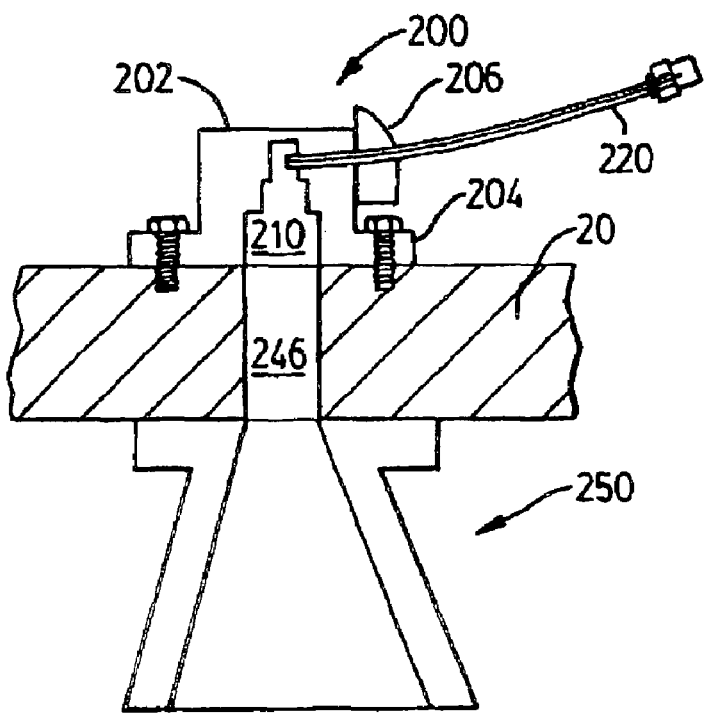
FIG. 2(b) shows a cross-sectional view of an antenna coupler with a transition mechanism according to the present invention configured for a horn type antenna.

Reference is next made to FIG. 2(a), which shows in more detail the antenna assembly 106 and the antenna coupler with a transition mechanism 200 according to the present invention. The antenna 240 comprises an upper section 242 and a lower section 244. In one embodiment, the waveguide 246 comprises a circular waveguide 246 and is coupled to the upper section 242 of the antenna 106 through the antenna coupler 200 which is mechanically attached to the housing 102. The antenna 240 is operatively coupled or electrically connected to level measurement circuitry 100 by the coaxial cable 220. The lower section 244 of the antenna 240 launches the electromagnetic energy, i.e. radar pulses or continuous radar waves, into the vessel 20 and receives the reflected pulses. The upper section 242 of the antenna 240 and the circular waveguide 246 are coupled to the coaxial waveguide or cable 220 by the transition mechanism 210 in the antenna coupler 200 as will be described in more detail.

As shown in FIG. 2(a), the antenna coupler 200 comprises a body member 202, a flange 204 (for example, a circular flange), a coaxial waveguide connector or coupling mechanism 206 and a transition mechanism 210. The flange 204 provides a mechanical mounting surface for a mating surface on the housing assembly 102 or the vessel 20.

Figure 3C:
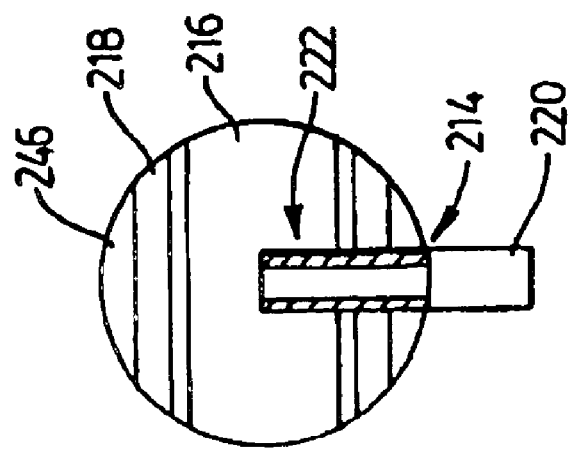
FIG. 3(c) shows a top view of the coupling mechanism of FIG. 3(a)
Figure 3B:
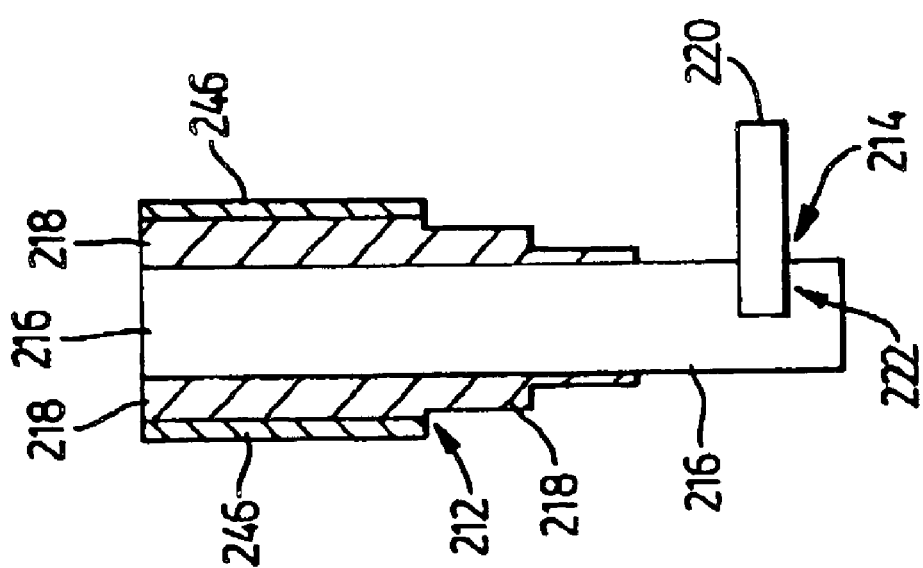
FIG. 3(b) shows a cross-sectional side view of the coupling mechanism of FIG. 3(a) taken along the line A-A.
Figure 3A:
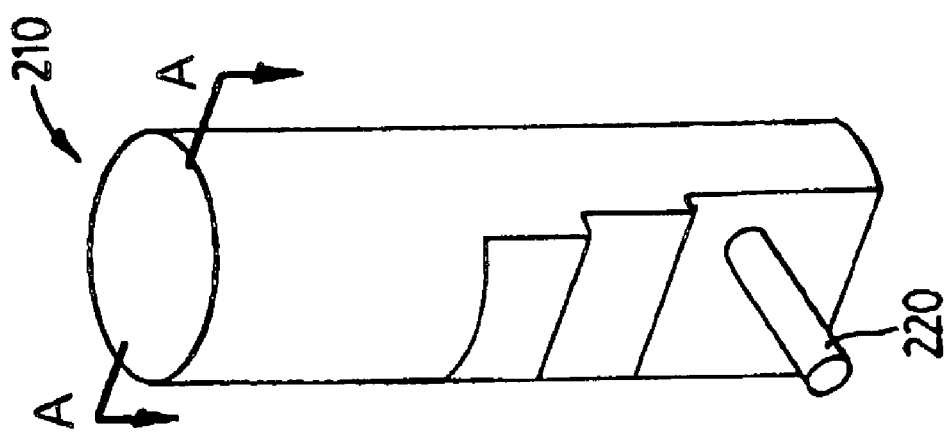
FIG. 3(a) shows a wire frame view of the coupling mechanism according to the present invention.

As shown in more detail in FIGS. 3(a) to 3(c), the transition mechanism 210 comprises a waveguide port or interface 212, a coaxial waveguide port 214, a lower or matching waveguide 216, and an impedance transformer 218. The waveguide port 212 provides an interface or coupling surface for the circular waveguide 246, for example, as illustrated in FIG. 3(b). The coaxial waveguide port 214 comprises a bore or cavity in the matching waveguide 216. The coaxial cable or waveguide 220 passes through an opening in the coaxial waveguide connector 206 and the stripped end 222 of cable 220 is inserted into the coaxial waveguide port 214. In the alternative, the coaxial waveguide 220 may comprise a single conductor circular waveguide.

The function of the lower waveguide 216 is to provide a waveguide impedance that is close to or within the range of the impedance of the coaxial cable or waveguide 220. For example, if the impedance for a 0.141-type coaxial cable is approximately 51 Ohms, then the impedance for the matching waveguide should be in the range 48 to 52 Ohms. This arrangement allows the matching of the impedance of the coaxial waveguide 220 and the impedance of the lower waveguide 216 to be optimized over a wider frequency band, for example, 22000 MHz to 28000 MHz in a level measurement application. For a rectangular waveguide configuration, the lower or matching waveguide 216 operates in a TE10 waveguide mode. For a rounded rectangular waveguide configuration, the lower or matching waveguide operates in a quasi-TE10 waveguide mode of operation.

The impedance transformer 218 functions to perform matching between the lower or matching waveguide 216 and the circular waveguide 246 (i.e. the upper section 242 of the antenna 240 as shown in FIG. 2). According to this aspect, the circular waveguide 246 operates in a TE11 waveguide mode. The impedance transformer 218 may be implemented in a two-stage configuration as shown in FIG. 3(b), or as a single-stage transformer or a multi-stage transformer, depending on the specifications for the particular application.

As shown in FIG. 2(b), the antenna coupler 200 and the transition mechanism 210 may also be configured for use with a horn antenna 250.

Figure 4:
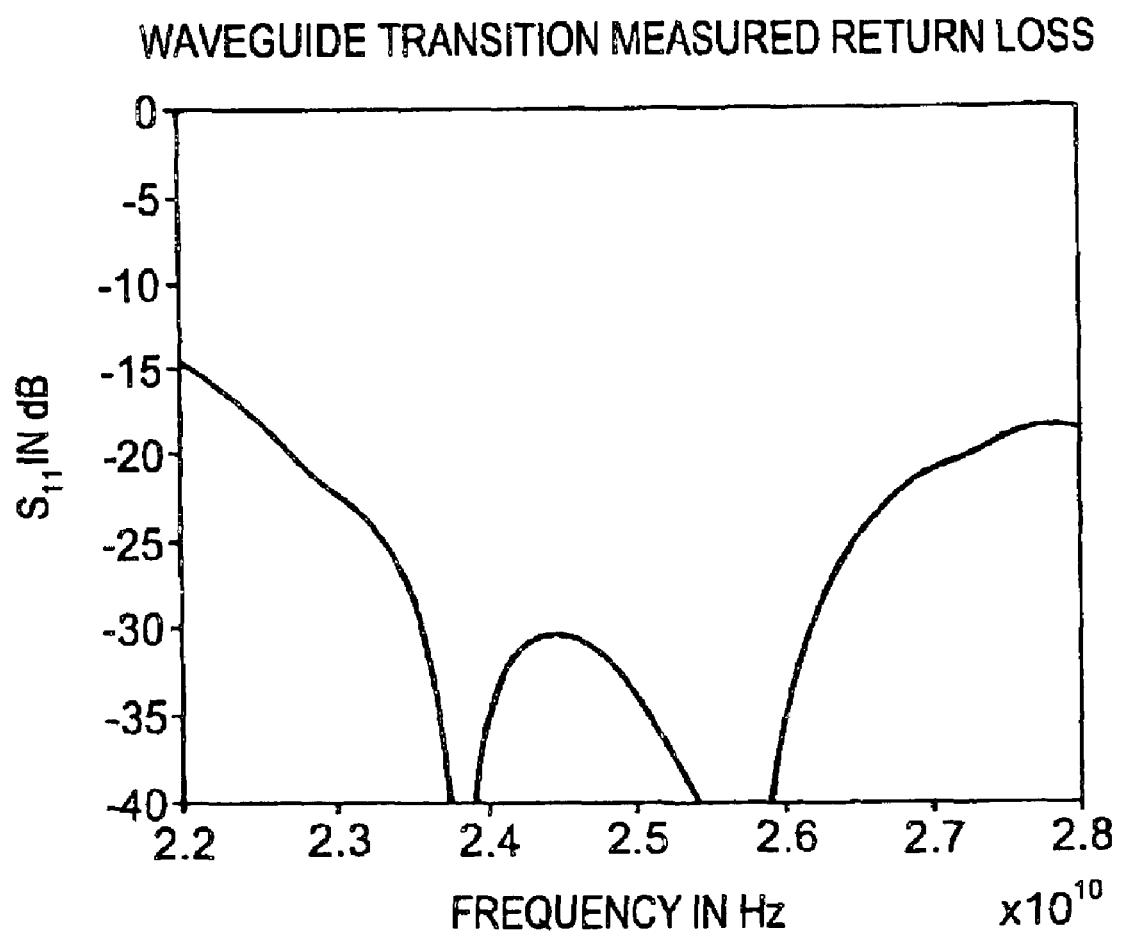
FIG. 4 is a graph showing exemplary return loss characteristics for the antenna coupler and transition mechanism according to the present invention.

Reference is next made to FIG. 4, which shows in graphical form an example of measured return loss for an antenna coupler incorporating the transition mechanism according to the present invention. In this example, the transition mechanism is terminated with −45 dB waveguide load, i.e. circular waveguide load.

Figure 5A:
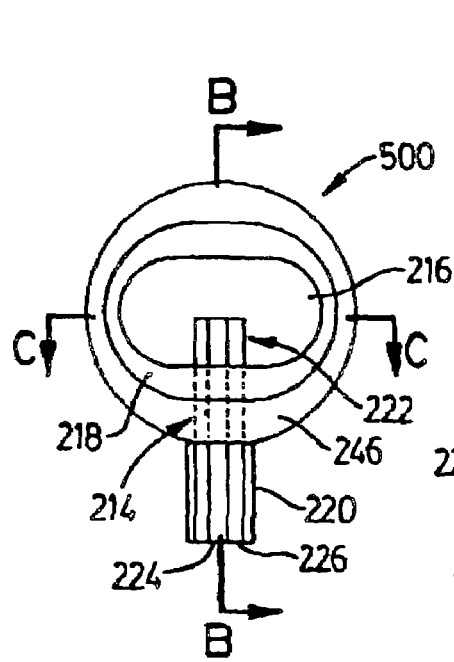
FIG. 5(a) shows a top view of a transition mechanism according to one embodiment of the present invention.
Figure 5B:
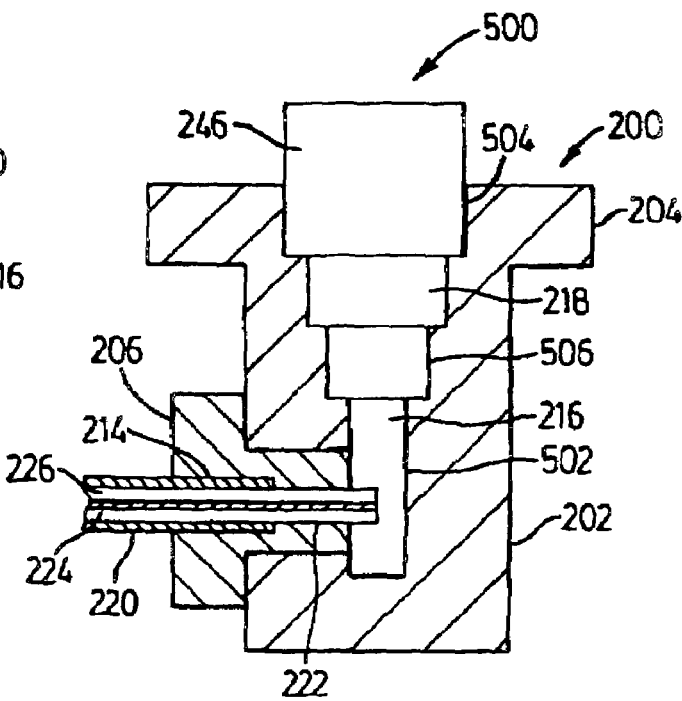
FIG. 5(b) shows a cross-sectional view of the coupler and the transition mechanism of FIG. 5(a) taken along the line B-B.
Figure 5C:
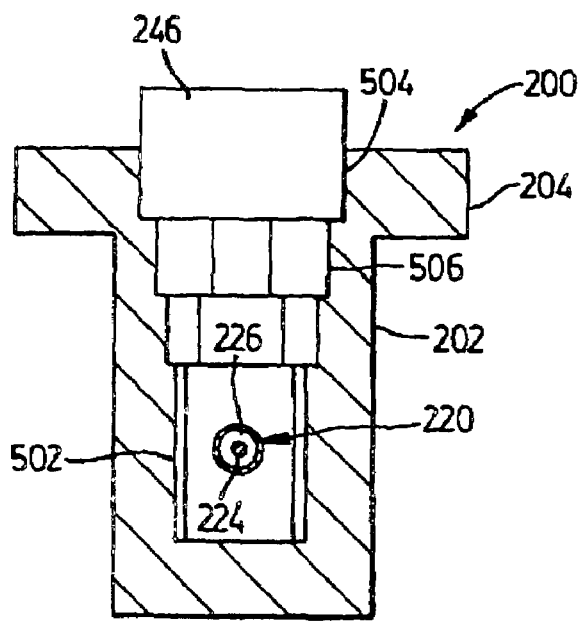
FIG. 5(c) shows a cross-sectional view of the coupler and the transition mechanism of FIG. 5(a) taken along the line C-C.

Reference is next made to FIGS. 5(a), 5(b) and 5(c), which shows the antenna coupler 200 with a transition mechanism 500 according to one embodiment of the present invention. The body member 202 is configured for the transition mechanism 500 as depicted in FIG. 5, and comprises a lower section 502 for receiving the matching waveguide 216 (FIG. 3), an upper section 504 for the circular waveguide 246 (FIG. 3), and a transition section 506 for the impedance transformer 218 (FIG. 3). According to this embodiment, the width of the lower section 502 is less than the width of the upper section 504 (which receives the circular waveguide). As described above, the coaxial waveguide or cable 220 is inserted through the coaxial waveguide connector 206 and into the coaxial waveguide port 214, and the stripped end 222 (i.e. conductor 224 and dielectric 226) extends into the lower section 502 and couples to the matching waveguide 216.

Figure 6A:
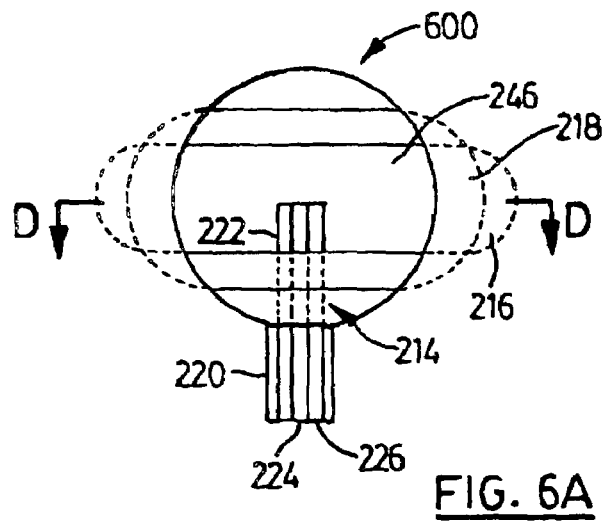
FIG. 6(a) shows a top view of a transition mechanism according to another embodiment of the present invention.
Figure 6B:
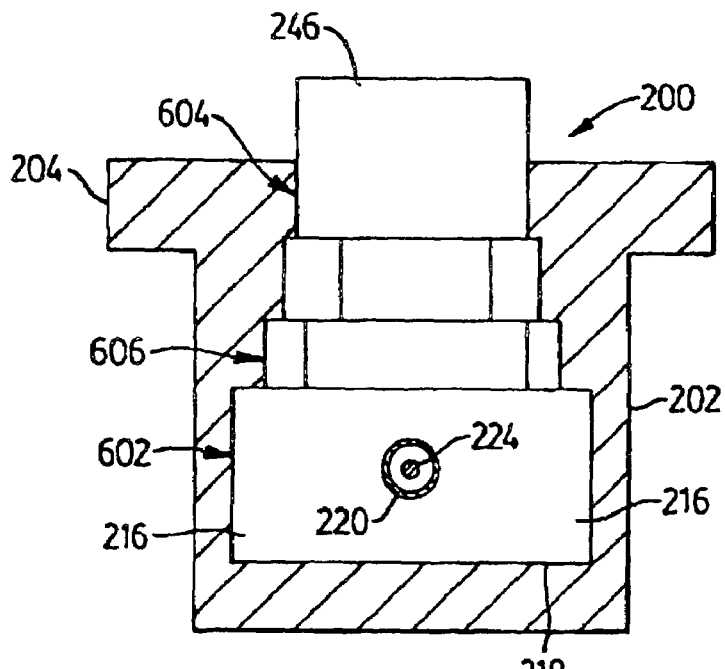
FIG. 6(b) shows a cross-sectional view of the coupler and the transition mechanism of FIG. 6(a) taken along the line D-D.

Reference is next made to FIGS. 6(a) and 6(b), which shows the antenna coupler 200 with a transition mechanism 600 according to another embodiment of the present invention. The body member 202 is configured for the transition mechanism 600 as depicted in FIG. 6, and comprises a lower section 602 for receiving the matching waveguide 216 (FIG. 3), an upper section 604 for the circular waveguide 246 (FIG. 3), and a transition section 606 for the impedance transformer 218 (FIG. 3). According to this embodiment, the width of the lower section 602 is greater than the width of the upper section 604 (which receives the circular waveguide 246). As described above, the coaxial waveguide or cable 220 is inserted into the coaxial waveguide port 214 in the matching waveguide 216, and the stripped end 222 (FIG. 5(b)) of the coaxial cable 220 (i.e. the coaxial waveguide) extends into the lower section 602 and couples to the matching waveguide 216.

Figure 7:
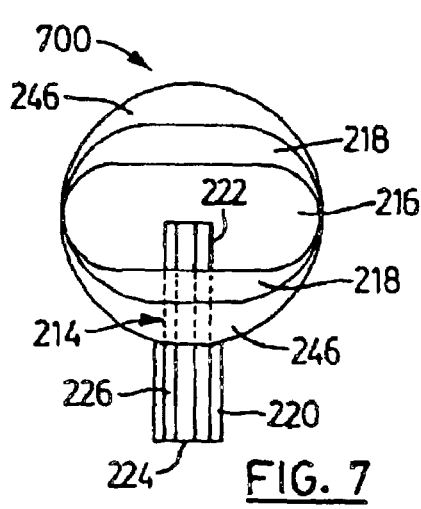
FIG. 7 shows a top view of a coupling mechanism according to yet another embodiment of the present invention.

Reference is next made to FIG. 7, which shows a transition mechanism 700 according to another embodiment of the present invention. According to this embodiment, the width of the lower waveguide, i.e. the matching waveguide 216, is substantially the same as the width of the upper waveguide, i.e. the circular waveguide 246. A similar arrangement is depicted in FIG. 3 above. While, the waveguide 246 has been described as a circular waveguide, it is to be appreciated that waveguide may take other forms, for example, a rectangle, a rectangle with rounded corners, an oval, or a rectangle with angled corners, an octagon.

Figure 8:
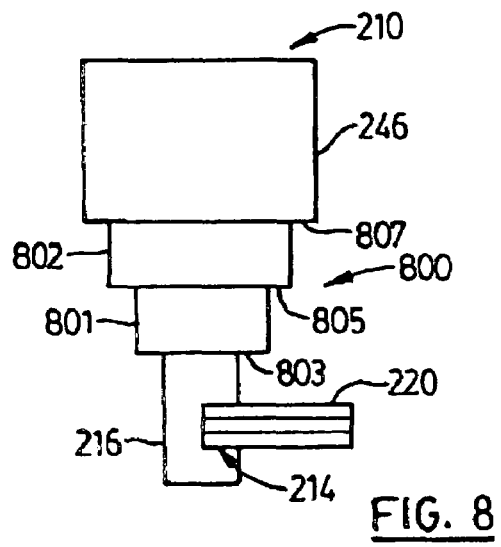
FIG. 8 shows a side view of an impedance transformer for the coupling mechanism according to one embodiment of the present invention.

Reference is next made to FIG. 8, which shows an impedance transformer 800 for the transition mechanism 210 (FIG. 2) according to one embodiment of the present invention. The impedance transformer 800 comprises a two-stage transformer having two waveguide transitions, indicated by references 801 and 802, respectively. The waveguide transitions 801, 802 are connected with straight steps, indicated by references 803, 805 and 807. In one embodiment, the waveguide transitions 801 and 802 are filled with air. In another embodiment or implementation the waveguide transitions 801, 802 are filled with a single dielectric filling material, for example, PolyTetra Fluoro-Ethylene or PTFE, Quartz Polypropylene, wax or other similar material. In yet another embodiment, the waveguide transitions 801 and 802 are filled with multiple or different types of dielectric filling materials, for example, PTFE, Quartz Polypropylene, wax or other similar material.

Figure 9:
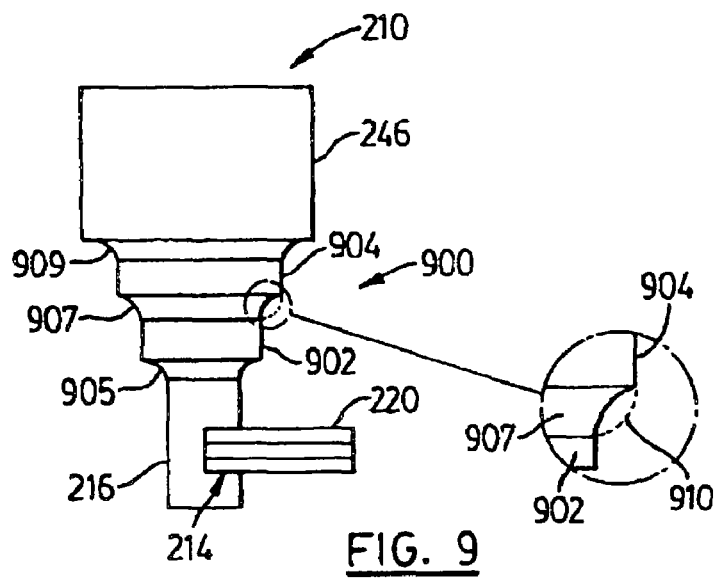
FIG. 9 shows a side view of an impedance transformer for the coupling mechanism according to a second embodiment of the present invention.

Reference is next made to FIG. 9, which shows an impedance transformer 900 for the transition mechanism 210 (FIG. 2) according to another embodiment of the present invention. The impedance transformer 900 comprises a two-stage transformer having two waveguide transitions, indicated by references 902 and 904, respectively. According to this embodiment, the waveguide transitions 902, 904 are connected with rounded steps. The rounded steps are indicated by references 905, 907 and 909, respectively. The rounded steps 905, 907, 909 are shown with a concave shape, but may comprise a convex shape as illustrated in broken outline and indicated by reference 910. As described above, the waveguide transitions 902, 904 (216, 246) may be air-filled, filled with a single dielectric filled or filled with multiple dielectric matters.

Figure 10:
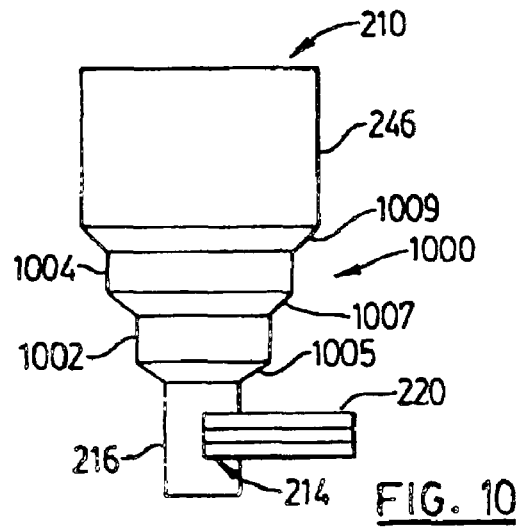
FIG. 10 shows a side view of an impedance transformer for the coupling mechanism according to a third embodiment of the present invention.

Reference is made to FIG. 10, which shows an impedance transformer 1000 for the transition mechanism 210 (FIG. 2) according to another embodiment of the present invention. The impedance transformer 1000 comprises a two-stage transformer having two waveguide transitions, indicated by references 1002 and 1004, respectively. According to this embodiment, the waveguide transitions 1002, 1004 are coupled with trapezium shaped steps. The trapezium shaped steps are indicated by references 1005, 1007 and 1009, respectively. As described above, the waveguide transitions 1002, 1004 (216, 246) may be air-filled, filled with a single dielectric filled or filled with multiple dielectric matters.

It will be appreciated that while the impedance transformers 800, 900 and 1000 as described above comprise two-stage configurations, the impedance transformer 218 (FIG. 2) may also be implemented as either single stage or multi-stage transformers.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A coupler mechanism for coupling a coaxial waveguide with a circular waveguide having a TE11 waveguide mode of operation, said coupler mechanism comprising:

a coaxial waveguide port for receiving said coaxial waveguide, said coaxial waveguide having a coaxial waveguide impedance;

a port for coupling said circular waveguide, said circular waveguide having a circular waveguide impedance;

an impedance transformer;

a matching waveguide; and a body member, said body member having a stepped section, said stepped section receiving said impedance transformer;

said matching waveguide being coupled to said coaxial waveguide port, said matching waveguide having an impedance matching the impedance of said coaxial waveguide and said matching waveguide further comprising a rounded rectangular waveguide having a quasi-TE10 waveguide mode of operation;

said impedance transformer having a first port for receiving said matching waveguide, a second port for said circular waveguide and a transition section, said transition section having one or more waveguide transitions and serving to match the impedance of said circular waveguide with the impedance of said matching waveguide; and said stepped section in said body member having one or more steps corresponding to said waveguide transitions.

2. The coupler mechanism as claimed in claim 1, wherein said impedance transformer comprises a two-stage impedance transformer having two of said waveguide transitions.

3. The coupler mechanism as claimed in claim 1, wherein said waveguide transitions comprise straight stepped transitions.

4. The coupler mechanism as claimed in claim 1, wherein said waveguide transitions comprise rounded stepped transitions.

5. The coupler mechanism as claimed in claim 1, wherein said waveguide transitions comprise angled stepped transitions.

6. The coupler mechanism as claimed in claim 1, wherein said matching waveguide comprises a substantially rectangular waveguide, said substantially rectangular waveguide having a TE10 waveguide mode of operation, and said circular waveguide having a TE11 waveguide mode of operation.

7. The coupler mechanism as claimed in claim 1, wherein said impedance transformer comprises a multiple stage impedance transformer having a plurality of said waveguide transitions corresponding to the number of stages.

8. The antenna coupler mechanism as claimed in claim 7, wherein said other waveguide comprises a circular waveguide, and said circular waveguide couples to the second port of said impedance transformer.

9. The coupler mechanism as claimed in claim 8, wherein said matching waveguide comprises a substantially rectangular waveguide, said substantially rectangular waveguide having a TE10 waveguide mode of operation, and said circular waveguide having a TE11 waveguide mode of operation.

10. The coupler mechanism as claimed in claim 8, wherein said matching waveguide comprises a rounded rectangular waveguide, said rounded rectangular waveguide having a quasi-TE10 waveguide mode of operation, and said circular waveguide having a TE11 waveguide mode of operation.

11. Apparatus for coupling a coaxial waveguide with a circular waveguide having a TE11 waveguide mode of operation, said apparatus comprising:
- a coaxial waveguide port for receiving said coaxial waveguide, said coaxial waveguide having a coaxial waveguide impedance, and said circular waveguide having an associated impedance;
- an impedance transformer;
- a matching waveguide;
- said matching waveguide being coupled to said coaxial waveguide port, said matching waveguide having an impedance matching the impedance of said coaxial waveguide and said matching waveguide further comprising a rectangular waveguide having a TE10 waveguide mode of operation;
- said impedance transformer having a first port for receiving said matching waveguide, a port for coupling to said circular waveguide and a transition section, said transition section having one or more waveguide transitions, said transition section serving to match the associated impedance of said circular waveguide with the impedance of said matching waveguide;
- a stepped section, said stepped section receiving said impedance transformer, and said stepped section having one or more steps corresponding to said waveguide transitions.

12. The apparatus as claimed in claim 11, wherein said impedance transformer comprises a two-stage impedance transformer having two of said waveguide transitions.

13. The apparatus as claimed in claim 12, wherein said waveguide transitions comprise straight stepped transitions.

14. The apparatus as claimed in claim 11, wherein said waveguide transitions comprise rounded stepped transitions.

15. The apparatus as claimed in claim 11, wherein said waveguide transitions comprise angled stepped transitions.

16. Apparatus for coupling a coaxial waveguide with a circular waveguide having a TE11 waveguide mode of operation, said apparatus comprising:
- a coaxial waveguide port for receiving said coaxial waveguide, said coaxial waveguide having a coaxial waveguide impedance, and said circular waveguide having an associated impedance;
- an impedance transformer;
- a matching waveguide;
- said matching waveguide being coupled to said coaxial waveguide port, and said matching waveguide having an impedance matching the impedance of said coaxial waveguide and said matching waveguide further comprising a rounded rectangular waveguide having a TE10 waveguide mode of operation;
- said impedance transformer having a first port for receiving said matching waveguide, a port for coupling to said circular waveguide and a transition section, said transition section having one or more waveguide transitions, said transition section serving to match the associated impedance of said circular waveguide with the impedance of said matching waveguide;
- a stepped section, said stepped section receiving said impedance transformer, and said stepped section having one or more steps corresponding to said waveguide transitions.

* * * * *